UNITED STATES PATENT OFFICE.

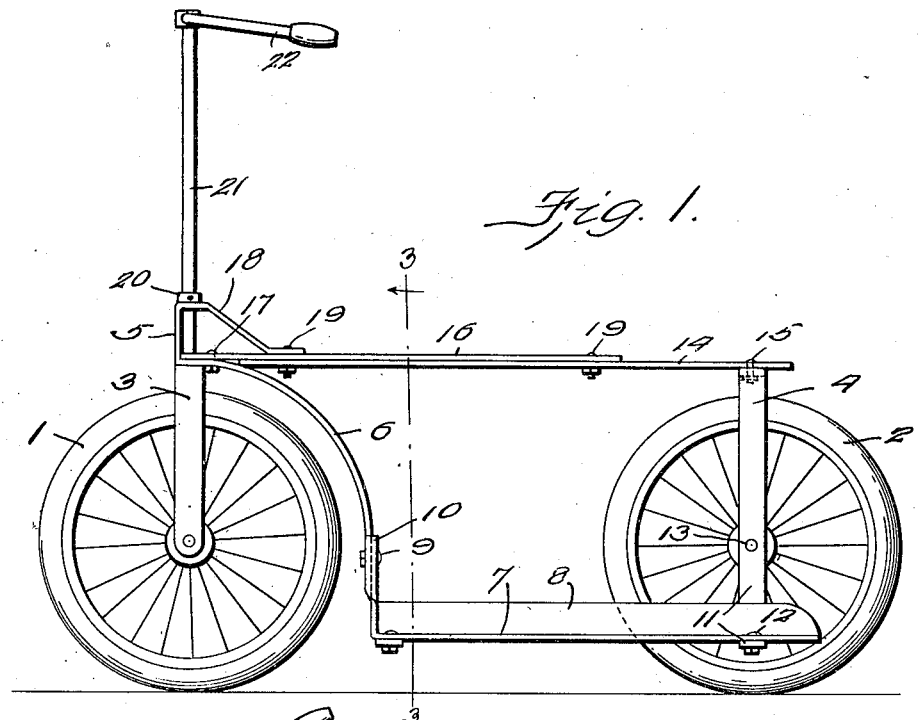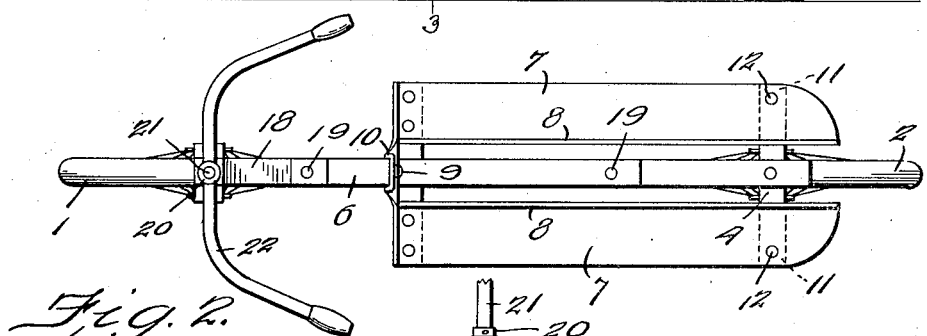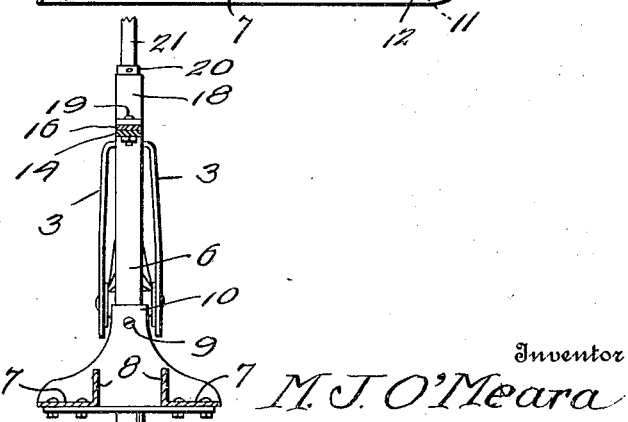

MICHAEL J. O'MEARA, OF ANDERSON, INDIANA.

CHILD'S VEHICLE.

1,352,213.　　　Specification of Letters Patent.　　Patented Sept. 7, 1920.

Application filed October 2, 1919. Serial No. 327,895.

*To all whom it may concern:*

Be it known that I, MICHAEL J. O'MEARA, a citizen of the United States, residing at Anderson, in the county of Madison and State of Indiana, have invented a new and useful Child's Vehicle, of which the following is a specification.

The object of my invention is to provide an improved child's vehicle adapted to be propelled by the foot of the rider and which is capable of carrying two children; which has a comparatively simple but substantial construction; which is adapted for utilizing relatively large wheels with rubber tires, and which may be speedily driven. I attain these and other objects of my invention by the device shown in the accompanying drawings, in which—

Figure 1 is a side elevation of my invention;

Fig. 2 is a top plan of same; and

Fig. 3 is a vertical section on line 3—3 of Fig. 1.

Like numerals designate like parts throughout the several views.

Referring to the accompanying drawings, I provide suitable wheels 1 and 2, preferably of large size and provided with rubber tires, which are mounted in the forks 3 and 4, respectively, the head of the forks being connected by the central bars 14 and 16, which may be adjustably attached to each other by suitable bolts 19 to permit of lengthening or shortening the vehicle if desired. Attached to the front fork 3 is a steering post 21 provided with handle bars 22 of conventional design of the bicycle type. Steering post 21 extends through a collar 20 which is mounted on a head frame 5, which in turn is affixed to the front forks 3 and provided with a brace 18 extending rearwardly and bolted to members 16 and 14, as shown in Fig. 1, while a lower extension member 6 of brace 5 forms a front wheel mud guard, and is attached by suitable bolt 9 to the upturned end 10 of the elongated coasting steps 7. Steps 7 are provided with upturned sides 8 in proximity to each other on either side of the rear wheel 2. Rear forks 4 to which member 14 is affixed are provided with extensions 11 on which steps 7 are secured by suitable bolts 12.

To operate the vehicle the child steps on one step and pushes the vehicle along with the other foot. By reason of the relatively low position of steps 7 it is comparatively easy to maintain equilibrium, and at the same time the danger of accident to the rider is diminished. As the steps are below the axle of the hind wheel children are given a chance to push the wheel from behind and get on instead of pushing from the side. A further advantage is that two children can ride on the vehicle at the same time, one child on either side of the vehicle. A ten, twelve or fourteen inch wheel can be used on the coaster without changing the wheel base. On account of the construction disclosed it can be operated at a greater speed than children's vehicles of the "scooter" type heretofore on the market. It can be manufactured at comparatively small cost and may be constructed of metal so as to provide a very substantial child's vehicle which cannot be easily broken if roughly handled.

What I claim is:

1. In a child's vehicle, the combination of alined wheels, frame members connecting the wheels and holding them in spaced relation, steering means connected with the front wheel and elongated twin steps suspended below the axle of the rear wheel, whereby to permit of two children coasting on the vehicle.

2. In a child's vehicle a wheel frame of the scooter type adapted to be mounted on relatively high wheels, alined wheels for said frame, steering means connected with the forward wheel, and horizontally extending twin steps supported from the frame and positioned in proximity to the ground, whereby to bring the center of gravity of the vehicle below the axles of the wheels when in operation.

3. In a child's vehicle, the combination of alined front and rear wheels, forks for said wheels, a frame rigidly connecting the forks, a bracing head member mounted on the front fork and having a brace extension attached to the aforesaid main frame, horizontally extending twin steps on either side of the rear wheel and positioned a considerable distance below the axle, rear fork extensions to which the rear portion of the rear steps are attached, and means supporting the forward end of the twin steps.

4. In a child's vehicle of the scooter type, a wheeled frame, steering means, and twin steps extending from a point close to the front wheel to a point beyond the axle of the rear wheel, said steps being rigidly supported at a point considerably below the axle of the rear vehicle, whereby the vehicle is adapted to carry two children and will maintain its equilibrium.

MICHAEL J. O'MEARA.